US011595919B2

(12) United States Patent
Wolf et al.

(10) Patent No.: US 11,595,919 B2
(45) Date of Patent: Feb. 28, 2023

(54) SSB CHANNEL CANCELATION

(71) Applicant: QUALCOMM Incorporated, San Diego, CA (US)

(72) Inventors: Guy Wolf, San Diego, CA (US); Sharon Levy, San Diego, CA (US); Igor Gutman, San Diego, CA (US); Yehonatan Dallal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 16/779,075

(22) Filed: Jan. 31, 2020

(65) Prior Publication Data

US 2021/0243703 A1 Aug. 5, 2021

(51) Int. Cl.
H04W 56/00 (2009.01)
H04B 7/01 (2006.01)
H04L 1/00 (2006.01)
H04L 27/26 (2006.01)
H04W 72/00 (2023.01)

(52) U.S. Cl.
CPC ............ H04W 56/001 (2013.01); H04B 7/01 (2013.01); H04L 1/0038 (2013.01); H04L 27/2657 (2013.01); H04L 27/2666 (2013.01); H04W 72/005 (2013.01)

(58) Field of Classification Search
CPC . H04W 56/001; H04W 72/00; H04W 72/005; H04B 1/10; H04B 7/01; H04B 2001/1045; H04B 1/7107; H04L 1/0038; H04L 27/2657; H04L 27/2666
See application file for complete search history.

(56) References Cited

U.S. PATENT DOCUMENTS

| 2011/0069793 | A1 | 3/2011 | Manakkal |
| 2014/0369300 | A1 | 12/2014 | Hu Sha |
| 2018/0279237 | A1* | 9/2018 | Kim ............... H04L 27/2692 |
| 2021/0045130 | A1* | 2/2021 | Tang ............... H04W 72/0433 |

FOREIGN PATENT DOCUMENTS

| WO | 2019201350 A1 | 10/2019 | |
| WO | WO-2019201350 A1 * | 10/2019 | ............ H04W 72/04 |

OTHER PUBLICATIONS

Yakov Kryukov, Cell search and synchronization in 5G NR, 2019, pp. 1-4 (Year: 2019).*
International Search Report and Written Opinion—PCT/US2021/015202—ISA/EPO—dated Apr. 16, 2021.

* cited by examiner

Primary Examiner — Michael Thier
Assistant Examiner — Prince A Mensah
(74) Attorney, Agent, or Firm — Arent Fox, LLP

(57) ABSTRACT

A synchronization signal block (SSB) transmitted by a neighbor base station may interfere with a physical downlink shared channel (PDSCH) transmitted by a serving base station. A user equipment (UE) that receives both the SSB and PDSCH may mitigate the interference to improve an error rate of decoding the PDSCH. The UE may receive a first SSB including a first broadcast channel (BCH) from a second base station other than a serving base station. The UE may decode the first SSB. The UE may determine, based on the first SSB and the first BCH, that the PDSCH scheduled by the serving base station will overlap with a second SSB from the second base station. The UE may estimate a channel of the second SSB based on the decoded first SSB. The UE may remove a reconstructed second SSB from the PDSCH. The UE may decode the PDSCH.

30 Claims, 9 Drawing Sheets

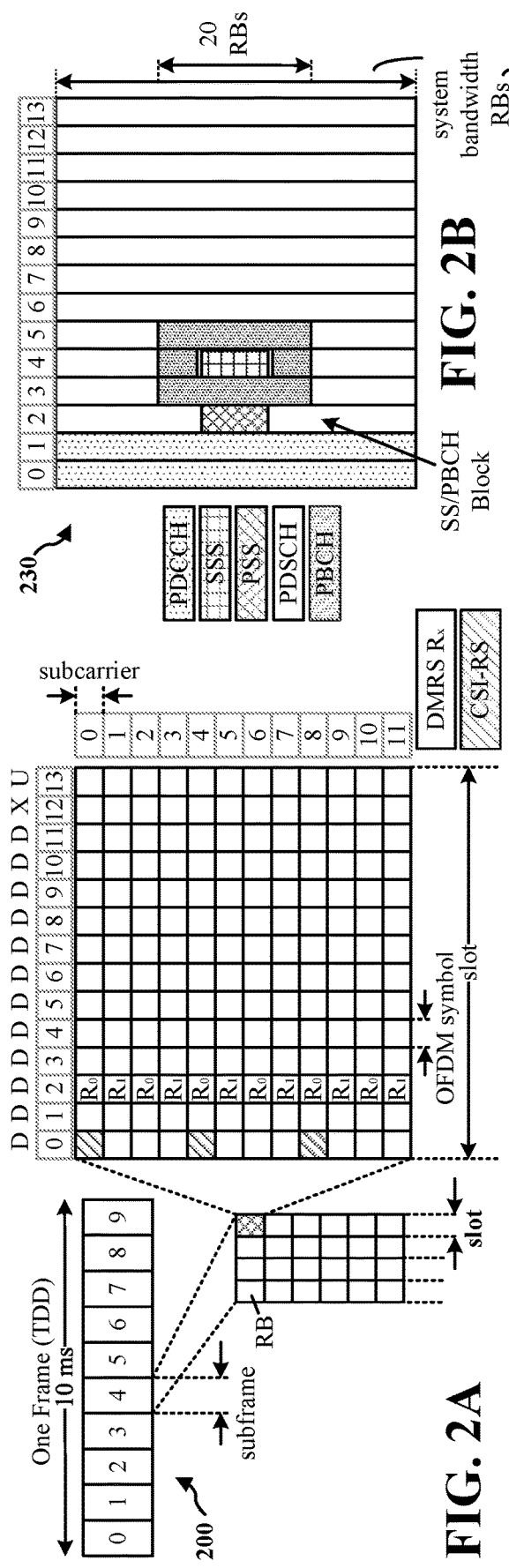
FIG. 2A
FIG. 2B
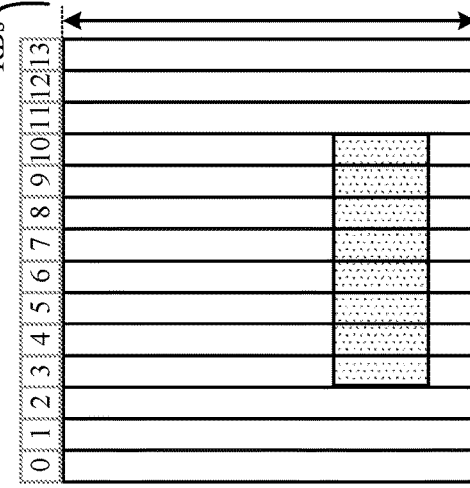
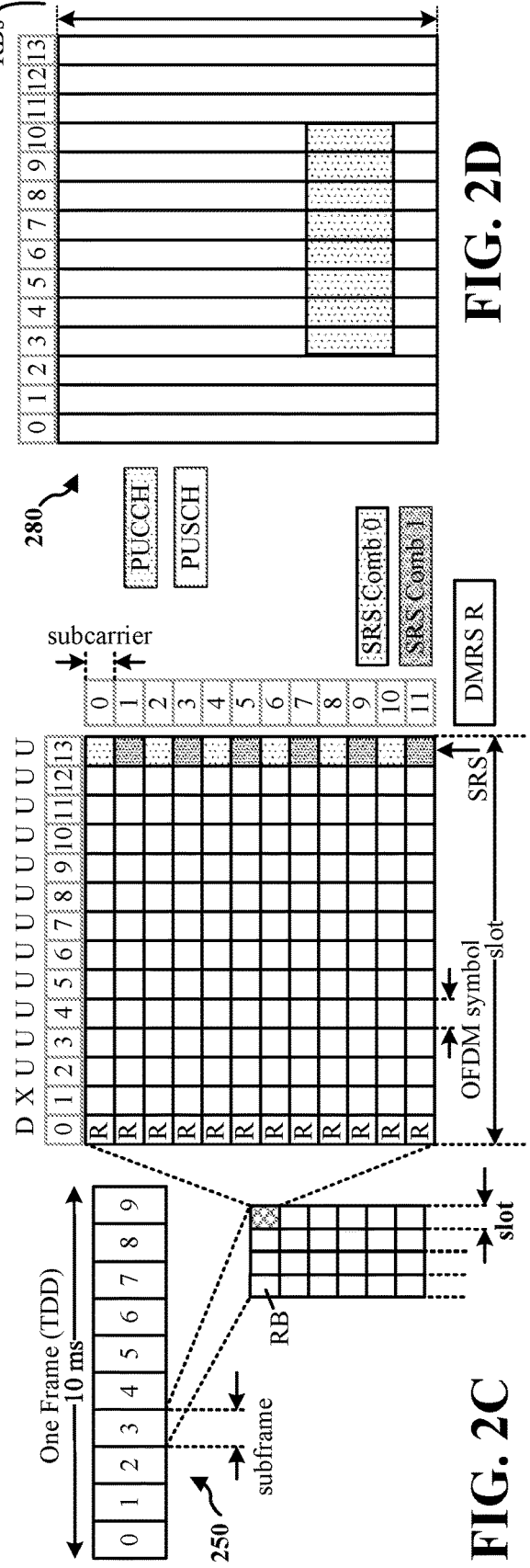
FIG. 2C
FIG. 2D

SSB CHANNEL CANCELATION

BACKGROUND

Technical Field

The present disclosure relates generally to communication systems, and more particularly, to synchronization signal block cancelation to reduce inter-cell interference.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may include receiving a first synchronization signal block (SSB) including a first broadcast channel (BCH) from a second base station other than a serving base station. The method may include decoding the first SSB. The method may include determining, based on the first SSB and the first BCH, that a physical downlink shared channel (PDSCH) scheduled by the serving base station will overlap with a second SSB from the second base station. The method may include estimating a channel of the second SSB based on the decoded first SSB. The method may include reconstructing the second SSB based on the estimated channel. The method may include removing the reconstructed second SSB from the PDSCH. The method may include decoding the PDSCH.

In an aspect of the disclosure, an apparatus for wireless communication may include a memory and at least one processor coupled with the memory. The at least one processor may be configured to receive a first SSB including a first BCH from a second base station other than a serving base station. The at least one processor may be configured to decode the first SSB. The at least one processor may be configured to determine, based on the first SSB and the first BCH, that a PDSCH scheduled by the serving base station will overlap with a second SSB from the second base station. The at least one processor may be configured to estimate a channel of the second SSB based on the decoded first SSB. The at least one processor may be configured to reconstruct the second SSB based on the estimated channel. The at least one processor may be configured to remove the reconstructed second SSB from the PDSCH. The at least one processor may be configured to decode the PDSCH.

In an aspect of the disclosure, an apparatus for wireless communication may include means for receiving a first SSB including a first BCH from a second base station other than a serving base station. The apparatus may include means for decoding the first SSB. The apparatus may include means for determining, based on the first SSB and the first BCH, that a PDSCH scheduled by the serving base station will overlap with a second SSB from the second base station. The apparatus may include means for estimating a channel of the second SSB based on the decoded first SSB. The apparatus may include means for reconstructing the second SSB based on the estimated channel. The apparatus may include means for removing the reconstructed second SSB from the PDSCH, wherein the means for decoding are configured to decode the PDSCH.

In an aspect, of the disclosure a non-transitory computer-readable medium may store computer executable code. The code when executed by a processor cause the processor to receive a first SSB including a first BCH from a second base station other than a serving base station. The non-transitory computer-readable medium may include code to decode the first SSB. The non-transitory computer-readable medium may include code to determine, based on the first SSB and the first BCH, that a PDSCH scheduled by the serving base station will overlap with a second SSB from the second base station. The non-transitory computer-readable medium may include code to estimate a channel of the second SSB based on the decoded first SSB. The non-transitory computer-readable medium may include code to reconstruct the second SSB based on the estimated channel. The non-transitory computer-readable medium may include code to remove the reconstructed second SSB from the PDSCH. The non-transitory computer-readable medium may include code to decode the PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame.

FIG. 2B is a diagram illustrating an example of DL channels within a 5G/NR subframe.

FIG. 2C is a diagram illustrating an example of a second 5G/NR frame.

FIG. 2D is a diagram illustrating an example of a 5G/NR subframe.

DETAILED DESCRIPTION

Figure 1:
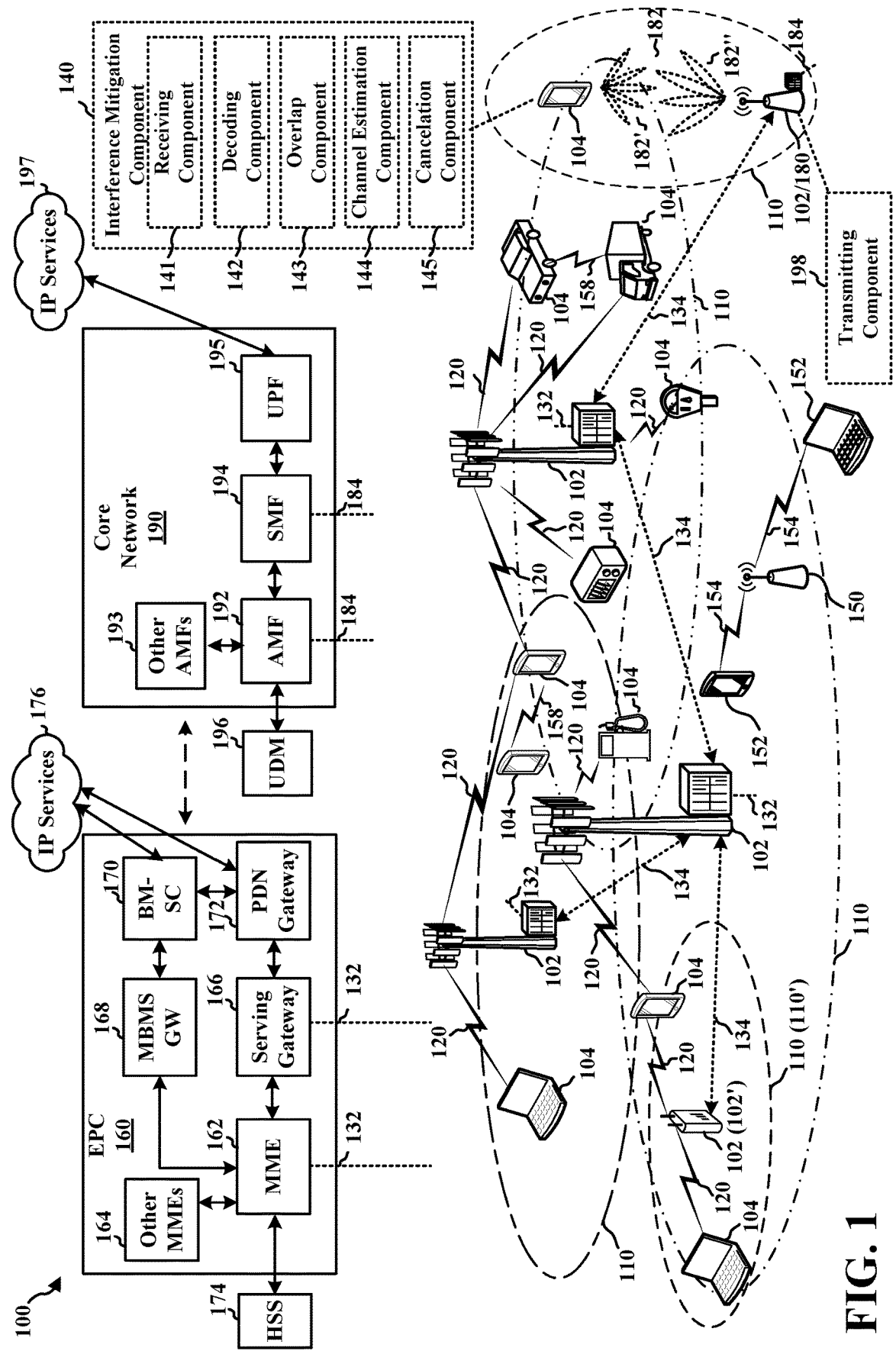
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Inter cell interference may limit physical downlink shared channel (PDSCH) performance in NR. While interference from PDSCH will be most likely detected in the demodulation reference signal (DMRS) symbols, common channels may be offset and may cause an increase in block error rate (BLER). Common channels that could cause asynchronous interference include the non-zero power (NZP) channel state information reference signal (CSI-RS) either used for tracking reference signal (TRS) or for channel state information (CSI) feedback. The NZP CSI-RS could be handled by the network using a zero-power (ZP) CSI-RS pattern.

In an aspect, a SSB channel, which includes both the synchronization channels (primary synchronization signal (PSS) and secondary synchronization signal (SSS)) as well as the system information may also cause inter cell interference. The SSB is used as part of beam management and mobility. In contrast to synchronization channels in LTE, in 5G NR, the number of SSBs and the location of the SSBs in time and frequency could vary between cells and over time. Accordingly, the SSB may be transmitted in a different location for a serving cell and interfering cells.

In LTE, the locations of the synchronization signals and broadcast channel were defined in standards, so the SSB of the serving cell and the SSB of neighbor cells were on the same location. In contrast, in 5G NR, the location is flexible in slot, symbol, frequency periodicity, which may potentially result in interference to the PDSCH. Additionally, in 5G NR, there is a much higher number of SSBs relative to LTE as a configuration will typically have multiple SSBs per beam (e.g., in mmW there may be up to 128 SSBs for the serving cell). Further, rate matching of PDSCH around SSBs for the serving cell may be used, but generally, there is no rate matching around transmissions of other cells. In view of the above, in 5G NR, the collision rate between the PDSCH and SSBs of other cells may be increased compared to LTE and have a higher impact on the overall throughput. For example, higher BLER may be observed in PDSCH transport blocks including REGs that overlap SSBs of neighbor cells in time and frequency.

In an aspect, the present disclosure provides for mitigation of interference between a PDSCH from a serving cell and an SSB from another cell (e.g., a neighbor cell). A UE may decode the SSB, which may include determining the PSS and SSS sequences, data bits of the broadcast channel, and time and frequency offsets. For example, decoding the SSB from the other cell may be performed on an SSB received when there is no overlapping PDSCH. Based on the decoded SSB, the UE may be able to determine the SSB transmission pattern of the other cell and determine when an SSB of the other cell overlaps a scheduled PDSCH. When there is an overlapping PDSCH to decode, the UE may use known symbols of the SSB as "pilots" to improve channel estimation over the SSB symbols. Using the estimated channel of the SSB, the UE may remove the interfering channel of the SSB from the PDSCH.

In some implementations, an iterative process of removing the estimated PDSCH symbol from the SSB prior to SSB channel estimation may also be used. SSB symbol verification may be performed by comparing the PSS and SSS sequences and data bits of the broadcast channel overlapping the PDSCH with the previously determined PSS and SSS sequences and data bits of the broadcast channel to ensure that the channel estimation is based on the correct symbols.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include an interference mitigation component 140 that mitigates interference to a PDSCH of a serving cell caused by a SSB of another cell. The interference mitigation component 140 may include: a receiving component 141 that receives a first SSB including a first broadcast channel (BCH) from the other base station; a decoding component 142 that decodes the first SSB; an overlap component 143 that determines, based on the first SSB and the first BCH, that the PDSCH scheduled by the serving base station will overlap with a second SSB from the other base station; a channel estimation component 144 that estimates a channel of the second SSB based on the decoded first SSB; and a cancelation component 145 that removes the estimated channel of the second SSB from the PDSCH. The decoding component 142 may also decode the PDSCH after the estimated channel of the second SSB is removed. In an aspect, the interference mitigation component 140 may operate in cooperation with a transmitting component 198 of a base station 102.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block, which may be referred to herein as an SSB. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
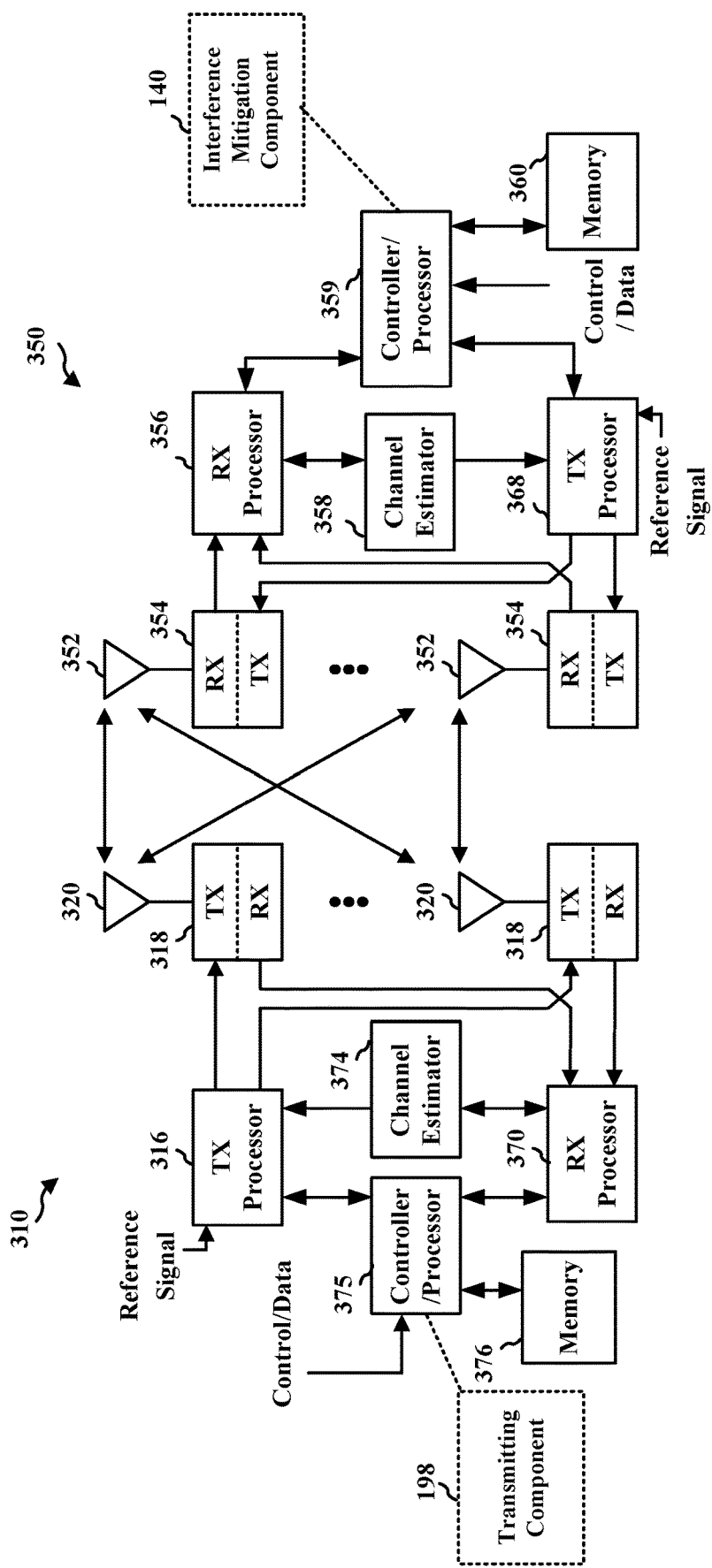
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the interference mitigation component 140 of FIG. 1.

Figure 4:
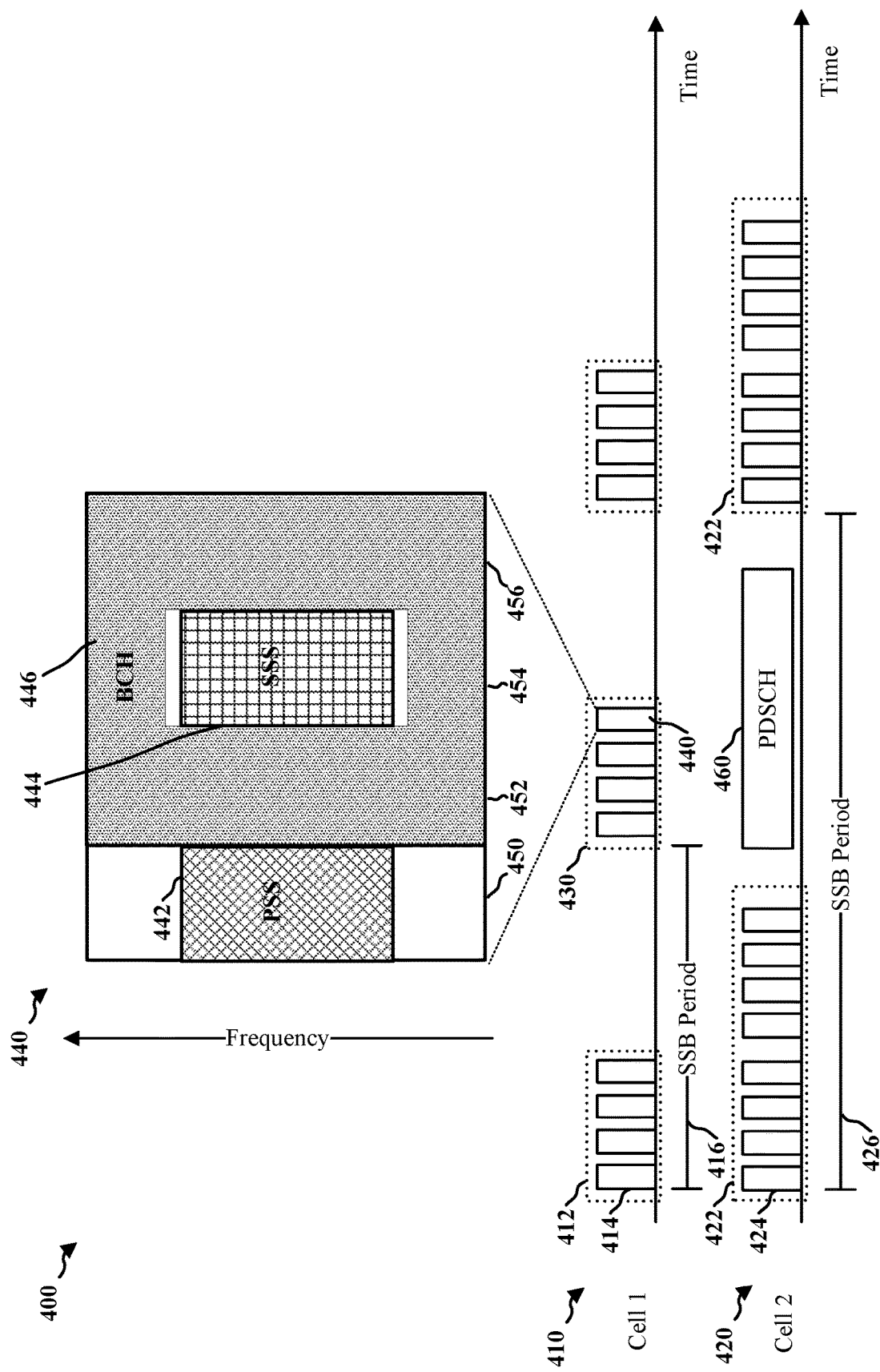
FIG. 4 is a resource diagram illustrating examples of SSB transmissions for a first cell and a second cell.

FIG. 4 is a resource diagram 400 including resources for a first cell 410 and a second cell 420 to transmit SSBs. The first cell 410 may be configured to transmit a first SSB set 412 during an SSB period 416. For example, the first SSB set 412 may include 4 SSBs 414, which may be transmitted according to a symbol pattern defined for a numerology or sub-carrier spacing by a standard or regulation. The first cell 410 may repeat the transmission of the first SSB set 412 (e.g., as an SSB set 430) after the SSB period 416, and in subsequent SSB periods. The duration of the SSB period 416 may be configurable, e.g., by a network operator.

The second cell 420 may be configured to transmit a second SSB set 422 during an SSB period 426. For example, the second SSB set 422 may include 8 SSBs 424, which may be transmitted according to a same or different symbol pattern defined for the numerology or sub-carrier spacing by a standard or regulation. For instance, the second cell 420 may utilize a different sub-carrier spacing and transmit with a different symbol pattern to include the 8 SSBs 424. The second cell 420 may repeat the transmission of the second SSB set 422 after the SSB period 426. The duration of the SSB period 426 may be configurable, e.g., by a network operator and may be the same or different than the SSB period 416. For example, the SSB period 426 may be a multiple of the SSB period 416.

Due to differences in the configuration of the SSB transmissions for the first cell 410 and the second cell 420, the first cell 410 and the second cell 420 may utilize different resources for SSB transmission. For example, the first cell 410 may transmit an SSB set 430 (which may be equivalent to the SSB set 412) including an SSB 440 during a time when the second cell 420 is not transmitting any SSB. Instead, the second cell 420 may utilize the resources for transmitting a PDSCH 460. Since the SSB set 430 and the PDSCH 460 utilize some of the same resources, the SSB set 430 including the SSB 440 may cause interference to portions of the PDSCH 460.

Further details of the SSB 440 are illustrated. As discussed above, the SSB 440 may include a PSS 442, a SSS 444, and a BCH 446. The PSS may be located on 126 REs in a first symbol 450, the SSS may be located on 126 REs in a third symbol 454, and the BCH 446 may be located on 230 REs in a second symbol 452 and fourth symbol 456 as well as portions of the third symbol 454 not used by the SSS. The PSS 442, SSS 444, and BCH 446 may all use antenna port P000. The SSS 444 and BCH 446 may be transmitted at the same power. The PSS power offset may be either 0 or 3 dB. The PSS and SSS may be fixed sequences, which may be a function of a cell ID and may be known from previous measurements. Most of the bits of the BCH 446 may also be known in advance (e.g., the same as a previous BCH) or extrapolated using timing information. For example, the BCH may include a system frame number, a common subcarrier spacing, an SSB subcarrier offset, a DMRS position, a PDCCH configuration, an indication of whether the cell is barred, an indication of whether intrafrequency reselection is allowed, and spare bits. The 8 most significant bits of the BCH may be generated by the MAC layer. For example, 5 of the bits may be the least significant bits of the frame number and half frame block index, which may be determined based on an offset of the second SSB from the first SSB. The other 3 bits of the BCH may be the SSB block index, which may be the same as the first SSB due to the periodic configuration of SSB. In another aspect, the other 3 bits may be the most significant bits of the carrier offset, which may be static (e.g., the same as the first SSB). The BCH may be coded using polar coding. Advance knowledge of the BCH bits may improve the polar decoding process and improve channel estimation. For example, the known bits of the BCH may act as pilot signals.

Figure 5:
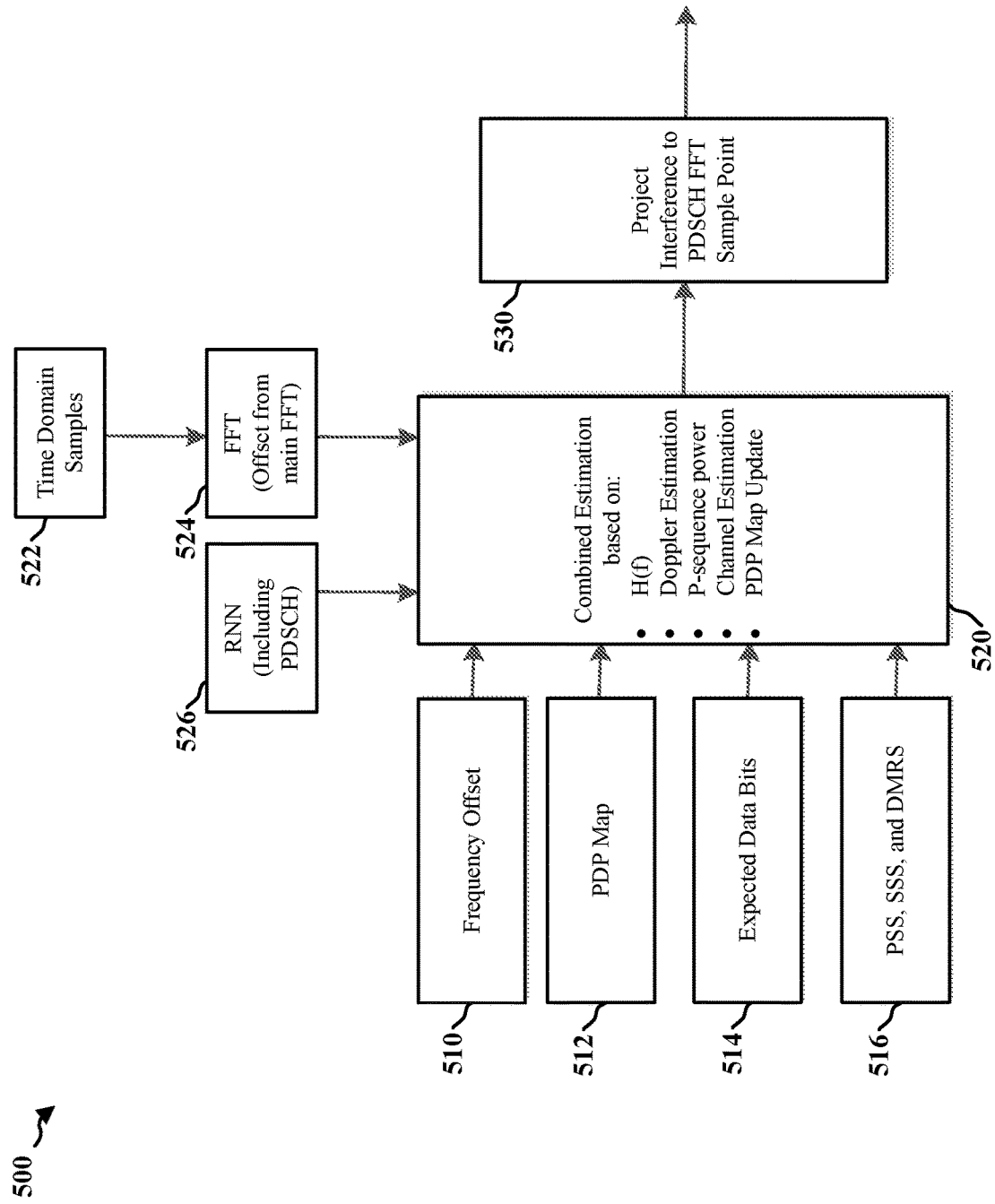
FIG. 5 is a diagram illustrating an example of a process for estimating a channel of an SSB.

FIG. 5 is a process diagram illustrating an example process 500 for estimating a channel of an SSB. The channel estimation component 144 may execute the process 500. The frequency offset 510, power delay profile (PDP) map 512, expected data bits 514, and PSS and SSS sequences and DMRS 516 may be known or predicted based on a previous SSB from the cell. Time domain samples 522 may represent the received signal, which may be processed via a fast Fourier transform (FFT) 524, which may be offset from a main FFT for decoding a PDSCH. In a synchronized system, where the serving base station is synchronized with a neighbor base station transmitting the SSB, the PDSCH FFT timing could be used to approximate inter symbol interference (ISI). The approximation of ISI may be used to reduce degradation due to cyclic prefix (CP) ramp up/down at the base station. A noise covariance matrix, Rnn 526, may include interference to the SSB caused by the PDSCH. In further iterations, where the PDSCH has been at least partially removed from the SSB, a change in Rnn may be used. The channel estimation component 144 may execute the combined estimation block 520 to combine an estimation of H(f), Doppler estimation, P-sequence power, channel estimation, and PDP map update. The channel estimation component 144 may project interference to the PDSCH FFT sample point at block 530 based on the combined channel estimation from the combined estimation block 520.

Figure 6:
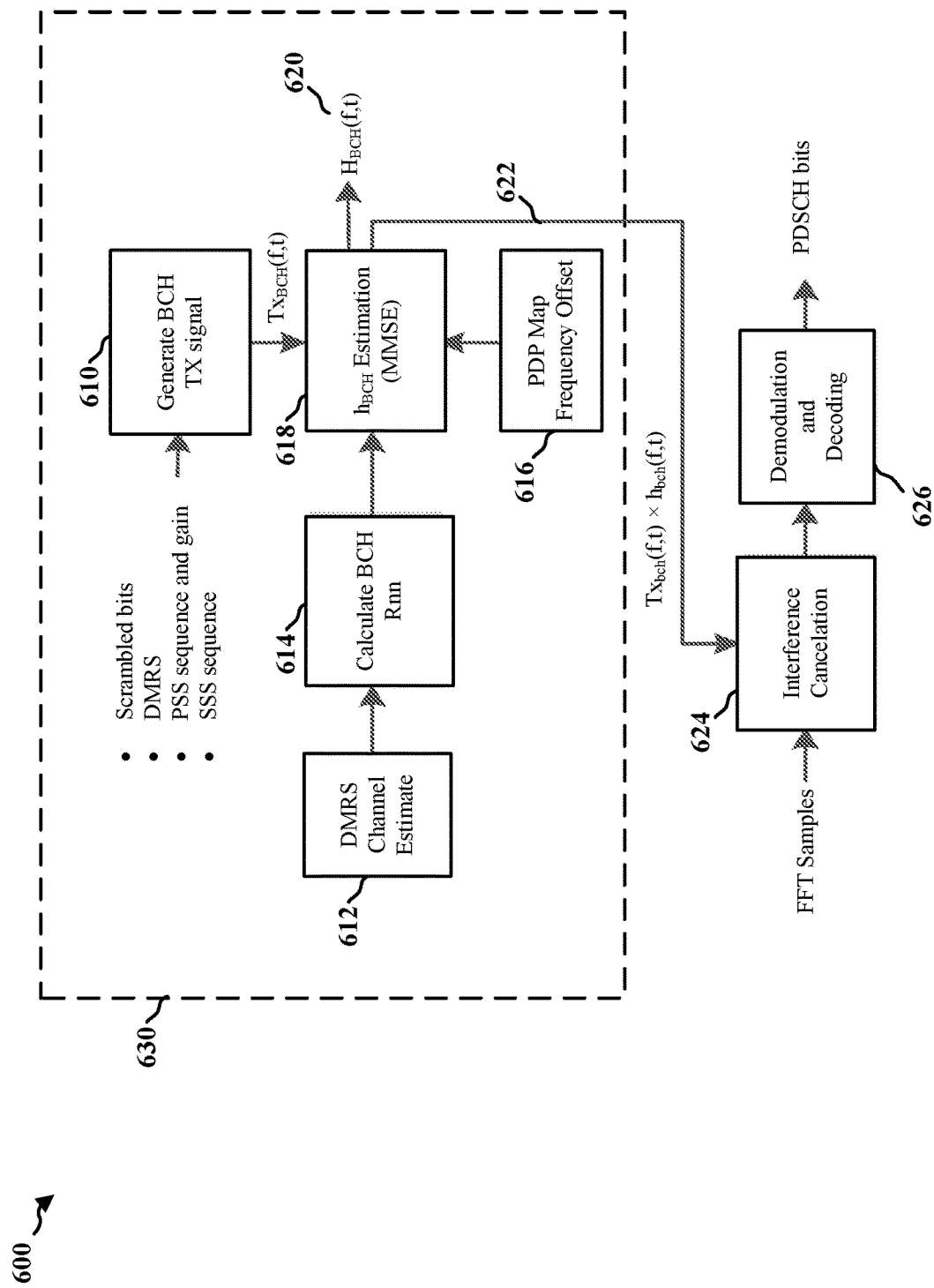
FIG. 6 is a diagram illustrating an example of a process for removing an estimated channel of an SSB from a PDSCH.

FIG. 6 is a process diagram illustrating an example process 600 for removing an estimated channel of the second SSB from the PDSCH. The second SSB may refer to any SSB received from a cell after an SSB from the cell has been decoded. The process 600 may include a process 630, which may be similar to the process 500 for estimating a channel of an SSB. For example, the channel estimation component 144 may execute block 610 to generate a BCH transmission signal ($Tx_{bch}(f, t)$) based on scrambled bits of the predicted BCH, a DMRS, a PSS sequence and gain, and an SSS sequence. The BCH transmission signal may be a function of frequency and time. The channel estimation component 144 may execute block 612 to estimate a channel of the DMRS for the PDSCH based on the known DMRS sequence. The channel estimation component 144 may calculate the BCH noise covariance matrix Rnn 614 based on the DMRS channel estimation. For example, the channel estimation component 144 may utilize the formula:

$$R_{nn}^{BCH}=N_0 I + \Sigma H_{dmrs}(:,l) \cdot (H_{dmrs}(:,l))^H$$

where No is Gaussian white noise, I is the identity matrix, and l is the number of layers.

The channel estimation component 144 may determine a PDP map frequency offset 616 for the BCH based on the frequency location of the BCH. The channel estimation component 144 may perform minimum mean square error estimation in block 618 to determine the estimated channel 620, which may be denoted as $h_{bch}(f,t)$. The block 618 may also generate the projected interference 622 which may be the cross product of the estimated channel 620 and the BCH transmission signal.

The cancelation component 145 may cancel the projected interference 622 from the FFT samples at block 624. The decoding component 142 may perform demodulation and decoding in block 626 to determine the PDSCH bits. The BLER of the block 626 may be reduced because the interference from the SBS has been at least partially cancelled.

Figure 7:
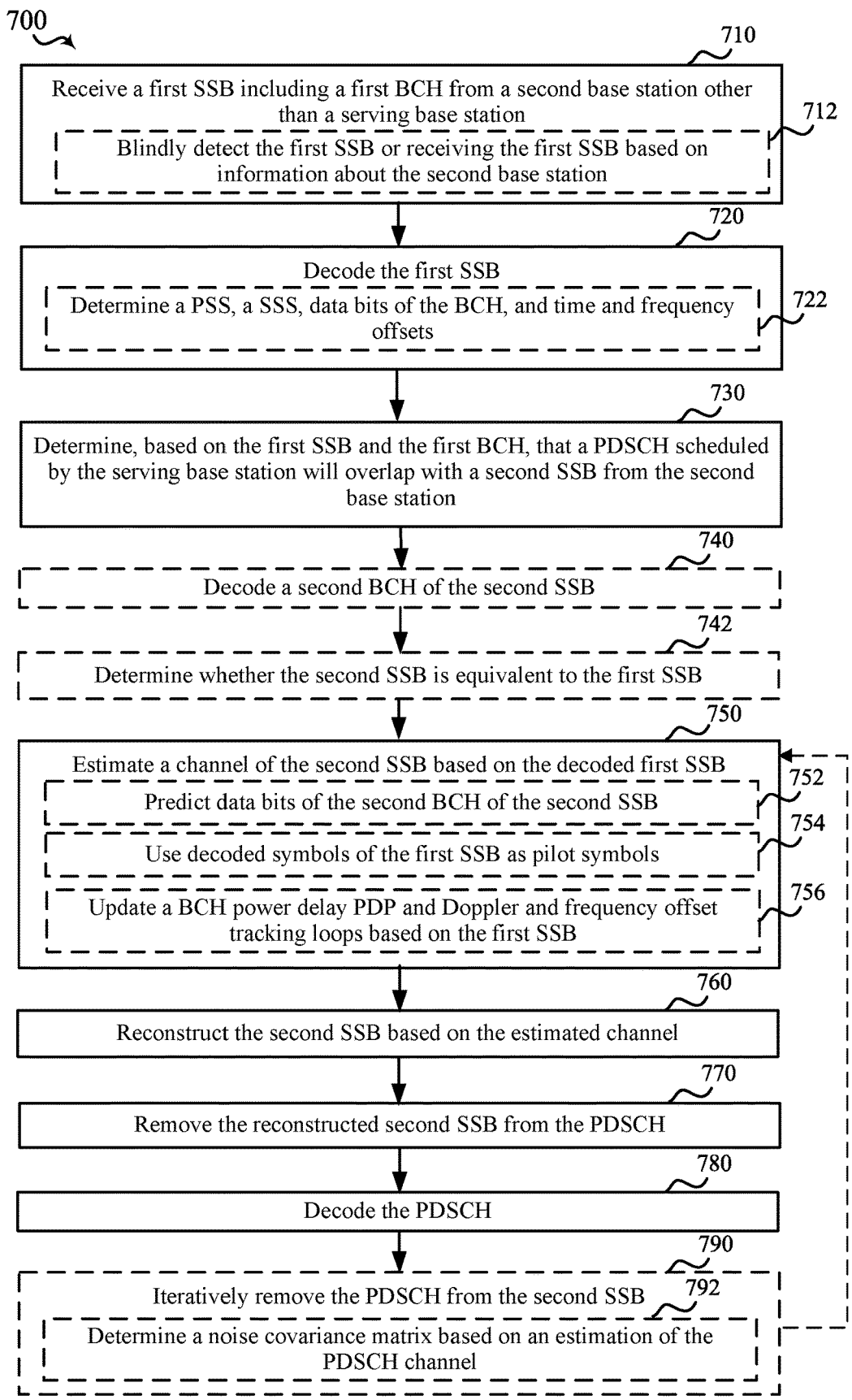
FIG. 7 is a flowchart of an example of a method of wireless communication.

FIG. 7 is a flowchart of an example method 700 interference mitigation. The method 700 may be performed by a UE (such as the UE 104, which may include the memory 360 and which may be the entire UE 104 or a component of the UE 104 such as the interference mitigation component 140, TX processor 368, the RX processor 356, or the controller/processor 359). The method 700 may be performed by the interference mitigation component 140 in communication with the transmitting component 198 of the base station 102.

At block 710, the method 700 may include receiving a first SSB including a first BCH from a second base station other than a serving base station. In an aspect, for example, the UE 104, the RX processor 356 and/or the controller/processor 359 may execute the interference mitigation component 140 and/or the receiving component 141 to receive a first SSB (e.g., SSB 414) including a first BCH 446 from a second base station (e.g., the first cell 410) other than a serving base station (e.g., the second cell 420). In an aspect, at sub-block 712, the block 710 may optionally include blindly detecting the first SSB or receiving the first SSB based on information about the second base station. For example, the receiving component 141 may blindly detect the first SSB by performing a cell search or the receiving component 141 may receive information about the second base station from the serving base station. Accordingly, the UE 104, RX processor 356, and/or the controller/processor 359 executing the interference mitigation component 140 and/or the receiving component 141 may provide means for receiving a first SSB including a first BCH from a second base station other than a serving base station.

At block 720, the method 700 may include decoding the first SSB. In an aspect, for example, the UE 104, the RX processor 356 and/or the controller/processor 359 may execute the interference mitigation component 140 and/or the decoding component 142 to decode the first SSB 414. In an aspect, at sub-block 722, the block 720 may optionally include determining a PSS sequence, a SSS sequence, data bits of the BCH, and time and frequency offsets. For example, the decoding component 142 perform correlations on the first SSB 414 to determine the PSS 442 and the SSS 444. The BCH may be coded using a polar code, and the decoding component 142 may perform polar decoding. The time and frequency offsets may be based on measurements of the PSS 442 and the SSS 444. Accordingly, the UE 104, RX processor 356, and/or the controller/processor 359 executing the interference mitigation component 140 and/or the decoding component 142 may provide means for decoding the first SSB.

At block 730, the method 700 may include determining, based on the first SSB and the first BCH, that a PDSCH scheduled by the serving base station will overlap with a second SSB from the second base station. In an aspect, for example, the UE 104, the RX processor 356 and/or the controller/processor 359 may execute the interference mitigation component 140 and/or the overlap component 143 to determine, based on the first SSB 414 and the first BCH 446, that a PDSCH 460 scheduled by the serving base station (e.g., the second cell 420) will overlap with a second SSB (e.g., SSB 440) from the second base station (e.g., the first cell 410). For example, the overlap component 143 may determine the time and frequency resources for SSBs for the second base station based on the BCH. In an aspect, the overlap component 143 may receive additional system information from the second base station, or from the serving base station, to determine the time and frequency resources for SSBs for the second base station. The overlap component 143 may determine the time and frequency resources for the PDSCH based on a DCI, semi-persistent scheduling, or configured grant that schedules the PDSCH. The overlap component 143 may determine that the PDSCH 460 will overlap with the SSB 440 when at least some of the time and frequency resources are the same. Accordingly, the UE 104, RX processor 356, and/or the controller/processor 359 executing the interference mitigation component 140 and/or the overlap component 143 may provide means for determining, based on the first SSB and the first BCH, that a PDSCH scheduled by the serving base station will overlap with a second SSB from the second base station.

At block 740, the method 700 may optionally include decoding a second BCH of the second SSB. In an aspect, for example, the UE 104, the RX processor 356 and/or the controller/processor 359 may execute the interference mitigation component 140 and/or the decoding component 142 to decode the BCH 446 of the SSB 440. The BCH 446 may be coded using a polar code, and the decoding component 142 may perform polar decoding. Accordingly, the UE 104, RX processor 356, and/or the controller/processor 359 executing the interference mitigation component 140 and/or the decoding component 142 may also provide means for decoding the BCH of the second SSB.

At block 742, the method 700 may optionally include determining whether the second SSB is equivalent to the first SSB. In an aspect, for example, the UE 104, the RX processor 356 and/or the controller/processor 359 may execute the interference mitigation component 140 and/or the decoding component 142 to determine the second SSB 440 is equivalent to the first SSB 414. For example, the decoding component 142 may compare the decoded bits of the first BCH and the second BCH. In an aspect, some bits of the BCH 446 may change in a predictable manner based on time (e.g. the system frame number field). The decoding component 142 may determine that the BCHs are equivalent when the second BCH has changed in the predictable manner (e.g., the decoded bits of the second BCH are the predicted bits for the second BCH). The decoding component 142 may also compare the PSS 442 and the SSS 444 to determine whether there has been any change from the first SSB 414 to the second SSB 440. Accordingly, the UE 104, RX processor 356, and/or the controller/processor 359 executing the interference mitigation component 140 and/or the decoding component 142 may also provide means for determining whether the second SSB is equivalent to the first SSB.

At block 750, the method 700 may include estimating a channel of the second SSB based on the decoded first SSB. In an aspect, for example, the UE 104, the RX processor 356 and/or the controller/processor 359 may execute the interference mitigation component 140 and/or the channel estimation component 144 to estimate a channel of the second SSB 440 based on the decoded first SSB 414. For example, in sub-block 752, the block 750 may optionally include predicting data bits of the second BCH 446 of the second SSB 440. For instance, the channel estimation component 144 may extrapolate a value of a system frame number from the value received in the SSB 414 based on the expected timing of the SSB 440. As another example, at sub-block 754, the block 750 may optionally include using decoded symbols of the first SSB as pilot symbols. For example, as discussed above with respect to FIG. 5, the known symbols for PSS, SSS, and DMRS 516 and the expected data bits 514 may be used as pilot symbols in the combined estimation block 520. As another example, at sub-block 756, the block 750 may include updating a BCH power delay PDP and Doppler and frequency offset tracking loops based on the first SSB. For example, the frequency offset 510 may be updated based on the PSS/SSS of the first SSB 414. Similarly, the PDP map 512 may be updated based on the BCH of the first SSB 414. Accordingly, the UE 104, RX processor 356, and/or the controller/processor 359 executing the interference mitigation component 140 and/or the channel estimation component 144 may provide means for estimating a channel of the second SSB based on the decoded first SSB.

At block 760, the method 700 may include reconstructing the second SSB based on the estimated channel. In an aspect, for example, the UE 104, RX processor 356, and/or the controller/processor 359 may execute the interference mitigation component 140 and/or the channel estimation component 144 (e.g., performing block 530 or block 618) to reconstruct the second SSB based on the estimated channel. For example, as described above with respect to block 530, reconstructing the second SSB may include projecting interference to the PDSCH FFT sample point. As another example, as described above with respect to block 618, reconstructing the second SSB may include determining the cross product of the estimated channel 620 and the BCH transmission signal generated in block 610. Accordingly, the UE 104, RX processor 356, and/or the controller/processor 359 executing the interference mitigation component 140 and/or the channel estimation component 144 performing block 530 or block 618 may provide means for reconstructing the second SSB based on the estimated channel.

At block 770, the method 700 may include removing the reconstructed second SSB from the PDSCH. In an aspect, for example, the UE 104, the RX processor 356 and/or the controller/processor 359 may execute the interference mitigation component 140 and/or the cancelation component 145 to remove the reconstructed second SSB (e.g., projected interference 622) from the PDSCH. The cancelation component 145 may remove the projected interference 622 from the FFT samples for the PDSCH by subtracting the projected interference 622 from the FFT samples. Accordingly, the UE 104, RX processor 356, and/or the controller/processor 359 executing the interference mitigation component 140 and/or the cancelation component 145 may provide means for removing the reconstructed second SSB from the PDSCH.

At block 780, the method 700 may include decoding the PDSCH. In an aspect, for example, the UE 104, the RX processor 356 and/or the controller/processor 359 may execute the interference mitigation component 140 and/or the decoding component 142 to decode the PDSCH 460. For instance, as discussed above regarding block 626 of FIG. 6, the decoding component 142 may perform demodulation and decoding on the FFT samples. The demodulation may be based on a modulation and coding scheme indicated in the DCI, SRS or CG scheduling the PDSCH 460. The decoding may be based on a coding (e.g., low density parity check (LDPC) coding) of the PDSCH 460. Accordingly, the UE 104, RX processor 356, and/or the controller/processor 359 executing the interference mitigation component 140 and/or the decoding component 142 may also provide means for decoding the PDSCH.

At block 790, the method 700 may optionally include iteratively removing the PDSCH from the second SSB. In an aspect, for example, the UE 104, the RX processor 356 and/or the controller/processor 359 may execute the interference mitigation component 140 and/or the cancelation component 145 to iteratively remove the PDSCH 460 from the second SSB 440. For example, at sub-block 792, the block 790 may include determining a noise covariance matrix based on an estimation of the PDSCH channel. As discussed above regarding FIG. 6, once the PDSCH is decoded, the channel estimation of the PDSCH may be removed from the Rnn 526 to more accurately estimate the channel of the SSB 440. The method 700 may return to block 760 to repeat the estimation of the channel of the second SSB, removing the estimated channel, and decoding the PDSCH. Accordingly, by iteratively removing the PDSCH 460 from the second SSB 440, the channel estimation of the second SSB 440 may be improved, which may improve the cancelation of the SSB 440 from the PDSCH 460. Several iterations may be performed, for example, until the PDSCH 460 is correctly decoded, a maximum number of iterations is reached, or the channel estimation of the SSB does not change. Accordingly, the UE 104, RX processor 356, and/or the controller/processor 359 executing the interference mitigation component 140 and/or the cancelation component 145 may also provide means for iteratively removing the PDSCH from the second SSB.

Figure 8:
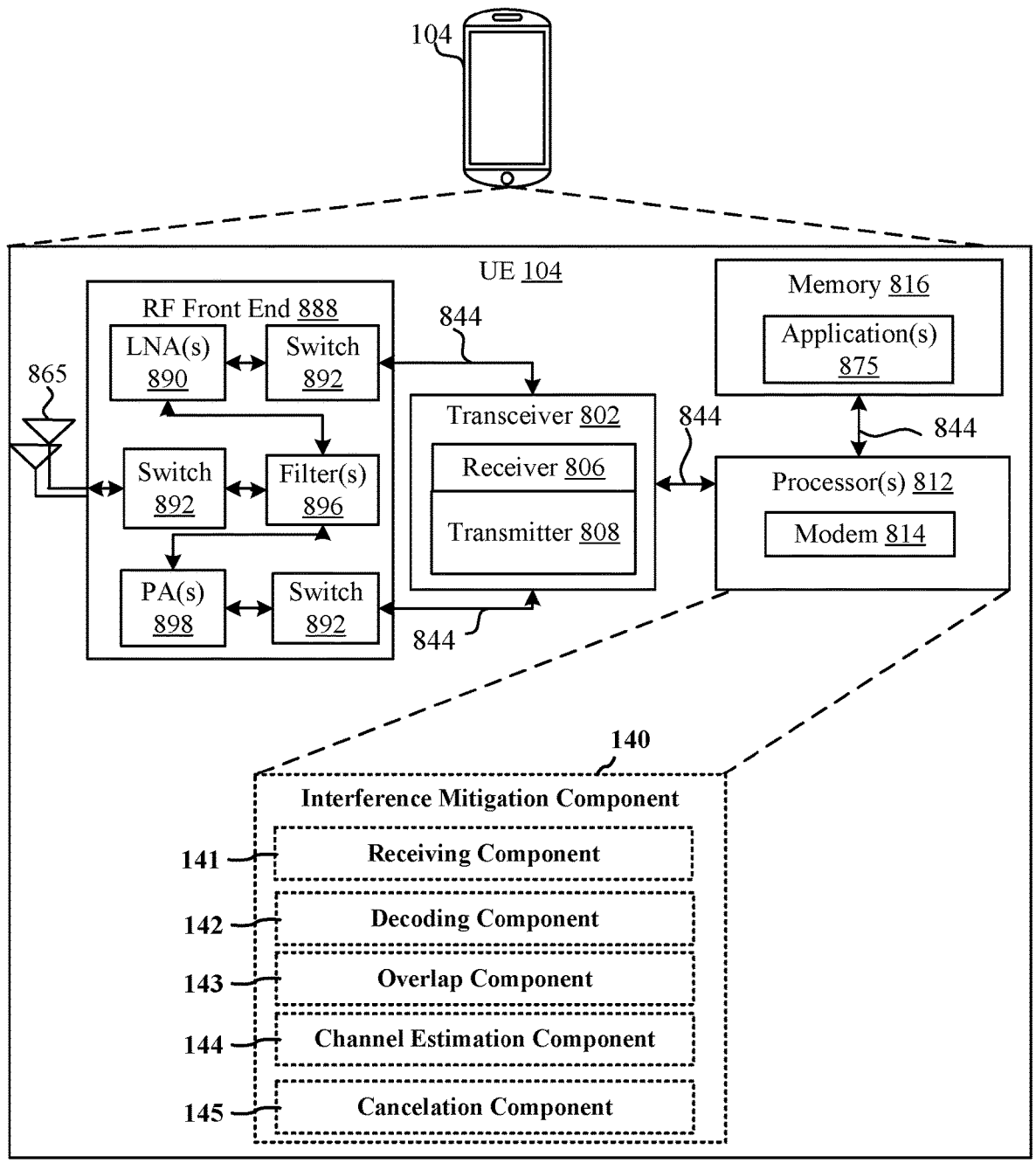
FIG. 8 is a diagram of example components of the UE of FIG. 1.

Referring to FIG. 8, one example of an implementation of UE 104 may include a variety of components, some of which have already been described above, but including components such as one or more processors 812 and memory 816 and transceiver 802 in communication via one or more buses 844, which may operate in conjunction with modem 814, and interference mitigation component 140 to enable one or more of the functions described herein related mitigating interference from an SSB. Further, the one or more processors 812, modem 814, memory 816, transceiver 802, RF front end 888 and one or more antennas 865 may be configured to support voice and/or data calls (simultaneously or non-simultaneously) in one or more radio access technologies. The antennas 865 may include one or more antennas, antenna elements, and/or antenna arrays.

In an aspect, the one or more processors 812 may include a modem 814 that uses one or more modem processors. The various functions related to interference mitigation component 140 may be included in modem 814 and/or processors 812 and, in an aspect, may be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with interference mitigation component 140 may be performed by transceiver 802.

Also, memory 816 may be configured to store data used herein and/or local versions of applications 875, interference mitigation component 140 and/or one or more of subcomponents thereof being executed by at least one processor 812. Memory 816 may include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining interference mitigation component 140 and/or one or more of subcomponents thereof, and/or data associated therewith, when UE 104 is operating at least one processor 812 to execute interference mitigation component 140 and/or one or more subcomponents thereof.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and may include one or more low-noise amplifiers (LNAs) 890, one or more switches 892, one or more power amplifiers (PAs) 898, and one or more filters 896 for transmitting and receiving RF signals.

In an aspect, LNA 890 may amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 may be used by RF front end 888 to filter a received signal to obtain an input RF signal. Similarly, in an aspect, for example, a respective filter 896 may be used to filter an output from a respective PA 898 to produce an output signal for transmission. In an aspect, each filter 896 may be connected to a specific LNA 890 and/or PA 898. In an aspect, RF front end 888 may use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver 802 may be tuned to operate at specified frequencies such that UE 104 can communicate with, for example, one or more base stations 102 or one or more cells associated with one or more base stations 102. In an aspect, for example, modem 814 may configure transceiver 802 to operate at a specified frequency and power level based on the UE configuration of the UE 104 and the communication protocol used by modem 814.

In an aspect, modem 814 may be a multiband-multimode modem, which can process digital data and communicate with transceiver 802 such that the digital data is sent and received using transceiver 802. In an aspect, modem 814 may be multiband and be configured to support multiple frequency bands for a specific communications protocol. In an aspect, modem 814 may be multimode and be configured to support multiple operating networks and communications protocols. In an aspect, modem 814 may control one or more components of UE 104 (e.g., RF front end 888, transceiver 802) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 9:
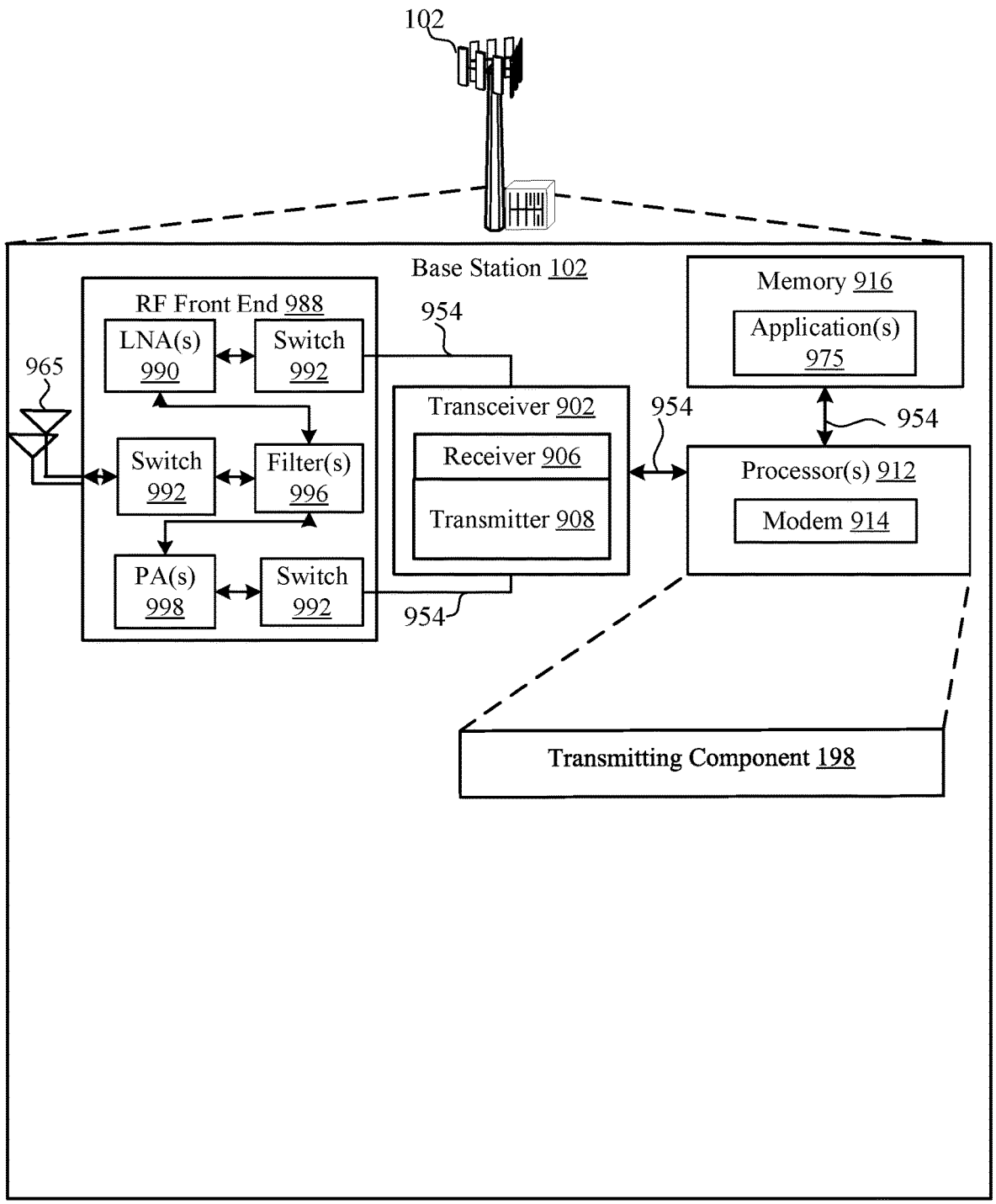
FIG. 9 is a diagram of example components of the base station of FIG. 1.

Referring to FIG. 9, one example of an implementation of base station 102 may include a variety of components, some of which have already been described above, but including components such as one or more processors 912 and memory 916 and transceiver 902 in communication via one or more buses 954, which may operate in conjunction with modem 914 and transmitting component 198 to enable one or more of the functions described herein related to transmitting a PDSCH.

The transceiver 902, receiver 906, transmitter 908, one or more processors 912, memory 916, applications 975, buses 954, RF front end 988, LNAs 990, switches 992, filters 996, PAs 998, and one or more antennas 965 may be the same as or similar to the corresponding components of UE 104, as described above, but configured or otherwise programmed for base station operations as opposed to UE operations.

Some Further Example Implementations

A first example method of wireless communication, comprising: receiving a first synchronization signal block (SSB) including a first broadcast channel (BCH) from a second base station other than a serving base station; decoding the first SSB; determining, based on the first SSB and the first BCH, that a physical downlink shared channel (PDSCH) scheduled by the serving base station will overlap with a second SSB from the second base station; estimating a channel of the second SSB based on the decoded first SSB; reconstructing the second SSB based on the estimated channel; removing the reconstructed second SSB from the PDSCH; and decoding the PDSCH.

The above first example method, wherein decoding the first SSB includes determining a primary synchronization sequence, a secondary synchronization sequence, data bits of the BCH, and time and frequency offsets.

Any of the above first example methods, wherein estimating the channel of the second SSB based on the decoded first SSB comprises predicting data bits of a second BCH of the second SSB.

Any of the above first example methods, wherein estimating the channel of the second SSB based on the decoded first SSB comprises using decoded symbols of the first SSB as pilot symbols.

Any of the above first example methods, further comprising iteratively removing the PDSCH from the second SSB.

Any of the above first example methods, wherein iteratively removing the PDSCH from the second SSB comprises determining a noise covariance matrix based on an estimation of the PDSCH channel, and determining a change in the noise covariance matrix for subsequent iterations.

Any of the above first example methods, further comprising: decoding a second BCH of the second SSB; and determining whether a second SSB including the second BCH, a primary synchronization signal and a secondary synchronization signal is equivalent to the first SSB, wherein estimating the channel of the second SSB is based on the first SSB when the first SSB is equivalent to the second SSB.

Any of the above first example methods, wherein estimating the channel of the second SSB based on the decoded first SSB comprises updating a BCH power delay profile (PDP) and Doppler and frequency offset tracking loops based on the first SSB.

Any of the above first example methods, wherein the first SSB does not overlap with a PDSCH scheduled by the serving base station.

Any of the above first example methods, wherein receiving the first SSB comprises blindly detecting the first SSB or receiving the first SSB based on information about the second base station.

A first example apparatus for wireless communication, comprising: a memory; and at least one processor coupled with the memory and configured to: receive a first synchronization signal block (SSB) including a first broadcast channel (BCH) from a second base station other than a serving base station; decode the first SSB; determine, based on the first SSB and the first BCH, that a physical downlink shared channel (PDSCH) scheduled by the serving base station will overlap with a second SSB from the second base station; estimate a channel of the second SSB based on the decoded first SSB; reconstruct the second SSB based on the estimated channel; remove the reconstructed second SSB from the PDSCH; and decode the PDSCH.

The above first example apparatus, wherein the at least one processor is configured to determine a primary synchronization sequence, a secondary synchronization sequence, data bits of the BCH, and time and frequency offsets.

Any of the above first example apparatuses, wherein the at least one processor is configured to estimate the channel of the second SSB based on the decoded first SSB by predicting data bits of a second BCH of the second SSB.

Any of the above first example apparatuses, wherein the at least one processor is configured to estimate the channel of the second SSB based on the decoded first SSB using decoded symbols of the first SSB as pilot symbols.

Any of the above first example apparatuses, wherein the at least one processor is configured to iteratively remove the PDSCH from the second SSB.

Any of the above first example apparatuses, wherein the at least one processor is configured to determine a noise covariance matrix based on an estimation of the PDSCH channel, and determine a change in the noise covariance matrix for subsequent iterations.

Any of the above first example apparatuses, wherein the at least one processor is configured to: decode a second BCH of the second SSB; and determine whether a second SSB including the second BCH, a primary synchronization signal and a secondary synchronization signal is equivalent to the first SSB, wherein estimating the channel of the second SSB is based on the first SSB when the first SSB is equivalent to the second SSB.

Any of the above first example apparatuses, wherein the at least one processor is configured to estimate the channel of the second SSB based on the decoded first SSB by updating a BCH power delay profile (PDP) and Doppler and frequency offset tracking loops based on the first SSB.

Any of the above first example apparatuses, wherein the first SSB does not overlap with a PDSCH scheduled by the serving base station.

Any of the above first example apparatuses, wherein the at least one processor is configured to blindly detect the first SSB or receive the first SSB based on information about the second base station.

A second example apparatus for wireless communication, comprising: means for receiving a first synchronization signal block (SSB) including a first broadcast channel (BCH) from a second base station other than a serving base station; means for decoding the first SSB; means for determining, based on the first SSB and the first BCH, that a physical downlink shared channel (PDSCH) scheduled by the serving base station will overlap with a second SSB from the second base station; means for estimating a channel of the second SSB based on the decoded first SSB; means for reconstructing the second SSB based on the estimated channel; and means for removing the reconstructed second SSB from the PDSCH, wherein the means for decoding are configured to decode the PDSCH.

The above second example apparatus, wherein the means for decoding is configured to determine a primary synchronization sequence, a secondary synchronization sequence, data bits of the BCH, and time and frequency offsets.

Any of the above second example apparatuses, wherein the means for estimating the channel of the second SSB based on the decoded first SSB is configured to predict data bits of a second BCH of the second SSB.

Any of the above second example apparatuses, wherein means for estimating the channel of the second SSB based on the decoded first SSB is configured to use decoded symbols of the first SSB as pilot symbols.

Any of the above second example apparatuses, wherein the means for removing is configured to remove the PDSCH from the second SSB.

Any of the above second example apparatuses, wherein the means for removing is configured to determine a noise covariance matrix based on an estimation of the PDSCH channel, and determine a change in the noise covariance matrix for subsequent iterations.

Any of the above second example apparatuses, wherein the means for decoding is configured to decode a second BCH of the second SSB and determine whether a second SSB including the second BCH, a primary synchronization signal and a secondary synchronization signal is equivalent to the first SSB, wherein estimating the channel of the second SSB is based on the first SSB when the first SSB is equivalent to the second SSB.

Any of the above second example apparatuses, wherein means for estimating the channel of the second SSB based on the decoded first SSB is configured to update a BCH power delay profile (PDP) and Doppler and frequency offset tracking loops based on the first SSB.

Any of the above second example apparatuses, wherein the first SSB does not overlap with a PDSCH scheduled by the serving base station.

An example non-transitory computer-readable medium storing computer executable code, the code when executed by a processor cause the processor to: receive a first synchronization signal block (SSB) including a first broadcast channel (BCH) from a second base station other than a serving base station; decode the first SSB; determine, based on the first SSB and the first BCH, that a physical downlink shared channel (PDSCH) scheduled by the serving base station will overlap with a second SSB from the second base station; estimate a channel of the second SSB based on the decoded first SSB; reconstruct the second SSB based on the estimated channel; remove the reconstructed second SSB from the PDSCH; and decode the PDSCH.

The above example non-transitory computer-readable medium, wherein the computer executable code includes code to perform any of the above first example methods.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    receiving a first synchronization signal block (SSB) including a first broadcast channel (BCH) from a second base station other than a serving base station;
    decoding the first SSB;
    determining, based on the first SSB and the first BCH, that a physical downlink shared channel (PDSCH) scheduled by the serving base station will overlap with a second SSB from the second base station;
    estimating a channel of the second SSB based on the decoded first SSB;
    reconstructing the second SSB based on the estimated channel;
    removing the reconstructed second SSB from the PDSCH;
    decoding the PDSCH; and
    removing the PDSCH from the second SSB.

2. The method of claim 1, wherein decoding the first SSB includes determining a primary synchronization sequence, a secondary synchronization sequence, data bits of the first BCH, and time and frequency offsets.

3. The method of claim 1, wherein estimating the channel of the second SSB based on the decoded first SSB comprises predicting data bits of a second BCH of the second SSB.

4. The method of claim 1, wherein estimating the channel of the second SSB based on the decoded first SSB comprises using decoded symbols of the first SSB as pilot symbols.

5. The method of claim 1, wherein removing the PDSCH from the second SSB comprises estimating the channel of the second SSB based on the removal of the PDSCH from the second SSB.

6. The method of claim 1, wherein removing the PDSCH from the second SSB comprises determining a noise covariance matrix based on an estimation of a channel of the PDSCH, and determining a change in the noise covariance matrix for subsequent iterations.

7. The method of claim 1, further comprising:
    decoding a second BCH of the second SSB; and
    determining whether the second SSB including the second BCH, a primary synchronization signal and a secondary synchronization signal is equivalent to the first SSB, wherein estimating the channel of the second SSB is based on the first SSB when the first SSB is equivalent to the second SSB.

8. The method of claim 1, wherein estimating the channel of the second SSB based on the decoded first SSB comprises updating a BCH power delay profile (PDP) and Doppler and frequency offset tracking loops based on the first SSB.

9. The method of claim 1, wherein the first SSB does not overlap with any PDSCH scheduled by the serving base station.

10. The method of claim 1, wherein receiving the first SSB comprises blindly detecting the first SSB or receiving the first SSB based on information about the second base station.

11. The method of claim 1, further comprising:
    estimating the channel of the second SSB based on the removal of the PDSCH from the second SSB; and
    canceling the second SSB from the PDSCH based on the estimate of the channel of the second SSB resulting from the removal of the PDSCH from the second SSB.

12. The method of claim 1, wherein removing the PDSCH from the second SSB comprises iteratively removing the PDSCH from the second SSB.

13. An apparatus for wireless communication, comprising:
    a memory; and
    at least one processor coupled with the memory and configured to:
    receive a first synchronization signal block (SSB) including a first broadcast channel (BCH) from a second base station other than a serving base station;
    decode the first SSB;
    determine, based on the first SSB and the first BCH, that a physical downlink shared channel (PDSCH) scheduled by the serving base station will overlap with a second SSB from the second base station;
    estimate a channel of the second SSB based on the decoded first SSB;
    reconstruct the second SSB based on the estimated channel;
    remove the reconstructed second SSB from the PDSCH;
    decode the PDSCH; and
    remove the PDSCH from the second SSB.

14. The apparatus of claim 13, wherein the at least one processor is configured to determine a primary synchronization sequence, a secondary synchronization sequence, data bits of the first BCH, and time and frequency offsets.

15. The apparatus of claim 13, wherein the at least one processor is configured to estimate the channel of the second SSB based on the decoded first SSB by predicting data bits of a second BCH of the second SSB.

16. The apparatus of claim 13, wherein the at least one processor is configured to estimate the channel of the second SSB based on the decoded first SSB using decoded symbols of the first SSB as pilot symbols.

17. The apparatus of claim 13, wherein the at least one processor is configured to iteratively estimate the channel of the second SSB based on the removal of the PDSCH from the second SSB.

18. The apparatus of claim 13, wherein the at least one processor is configured to determine a noise covariance matrix based on an estimation of a channel of the PDSCH, and determine a change in the noise covariance matrix for subsequent iterations.

19. The apparatus of claim 13, wherein the at least one processor is configured to:
    decode a second BCH of the second SSB; and
    determine whether the second SSB including the second BCH, a primary synchronization signal and a secondary synchronization signal is equivalent to the first SSB, wherein estimating the channel of the second SSB is based on the first SSB when the first SSB is equivalent to the second SSB.

20. The apparatus of claim 13, wherein the at least one processor is configured to estimate the channel of the second SSB based on the decoded first SSB by updating a BCH power delay profile (PDP) and Doppler and frequency offset tracking loops based on the first SSB.

21. The apparatus of claim 13, wherein the first SSB does not overlap with any PDSCH scheduled by the serving base station.

22. The apparatus of claim 13, wherein the at least one processor is configured to blindly detect the first SSB or receive the first SSB based on information about the second base station.

23. The apparatus of claim 13, wherein the at least one processor is configured to:
  estimate the channel of the second SSB based on the removal of the PDSCH from the second SSB; and
  cancel the second SSB from the PDSCH based on the estimate of the channel of the second SSB resulting from the removal of the PDSCH from the second SSB.

24. The apparatus of claim 13, wherein to remove the PDSCH from the second SSB, the at least one processor is configured to iteratively remove the PDSCH from the second SSB.

25. An apparatus for wireless communication, comprising:
  means for receiving a first synchronization signal block (SSB) including a first broadcast channel (BCH) from a second base station other than a serving base station;
  means for decoding the first SSB;
  means for determining, based on the first SSB and the first BCH, that a physical downlink shared channel (PDSCH) scheduled by the serving base station will overlap with a second SSB from the second base station;
  means for estimating a channel of the second SSB based on the decoded first SSB;
  means for reconstructing the second SSB based on the estimated channel; and
  means for removing the reconstructed second SSB from the PDSCH, wherein the means for decoding are configured to decode the PDSCH, wherein the means for removing is configured to remove the PDSCH from the second SSB.

26. The apparatus of claim 25, wherein the means for decoding is configured to determine a primary synchronization sequence, a secondary synchronization sequence, data bits of the first BCH, and time and frequency offsets.

27. The apparatus of claim 25, wherein the means for estimating the channel of the second SSB based on the decoded first SSB is configured to predict data bits of a second BCH of the second SSB.

28. The apparatus of claim 25, wherein the means for estimating the channel of the second SSB based on the decoded first SSB is configured to use decoded symbols of the first SSB as pilot symbols.

29. The apparatus of claim 25, wherein the means for removing is configured to estimate the channel of the second SSB based on the removal of the PDSCH from the second SSB.

30. A non-transitory computer-readable medium storing computer executable code, the code when executed by a processor cause the processor to:
  receive a first synchronization signal block (SSB) including a first broadcast channel (BCH) from a second base station other than a serving base station;
  decode the first SSB;
  determine, based on the first SSB and the first BCH, that a physical downlink shared channel (PDSCH) scheduled by the serving base station will overlap with a second SSB from the second base station;
  estimate a channel of the second SSB based on the decoded first SSB;
  reconstruct the second SSB based on the estimated channel;
  remove the reconstructed second SSB from the PDSCH;
  decode the PDSCH; and
  remove the PDSCH from the second SSB.

* * * * *